United States Patent
Kozlov et al.

(10) Patent No.: US 7,578,188 B2
(45) Date of Patent: Aug. 25, 2009

(54) CONVECTIVE ACCELEROMETER WITH "POSITIVE" OR "NEGATIVE" INERTIAL MASS

(76) Inventors: Vladimir A. Kozlov, Jersey City, NJ (US); Olga Kozlova, legal representative, 71 Chromov Street, Building #1 Apartment 12, Moscow 107392 (RU); Dasha Kozlova, legal representative, 71 Chromov Street, Building #1 Apartment 12, Moscow 107392 (RU); Vadim M. Agafonov, c/o MET TECH Inc., 317 Varick St., Jersey City, NJ (US) 07302

(*) Notice: Subject to any disclaimer, the term of this patent is extended or adjusted under 35 U.S.C. 154(b) by 0 days.

(21) Appl. No.: 11/684,633

(22) Filed: Mar. 11, 2007

(65) Prior Publication Data

US 2008/0216571 A1    Sep. 11, 2008

(51) Int. Cl.
*G01P 15/00* (2006.01)
(52) U.S. Cl. .............. 73/514.09; 73/514.05; 73/514.16
(58) Field of Classification Search .............. 73/514.05, 73/514.07, 514.09, 514.16
See application file for complete search history.

(56) References Cited

U.S. PATENT DOCUMENTS

| | | | | |
|---|---|---|---|---|
| 2,644,901 A | * | 7/1953 | Hardway, Jr. | 310/300 |
| 3,960,691 A | * | 6/1976 | Zoltan et al. | 204/408 |
| 6,382,025 B1 | * | 5/2002 | Hunter | 73/514.03 |
| 6,576,103 B2 | * | 6/2003 | Abramovich et al. | 204/412 |
| 2005/0257616 A1 | * | 11/2005 | Kozlov et al. | 73/514.16 |

FOREIGN PATENT DOCUMENTS

| JP | 2002-311043 | 10/2002 |
|---|---|---|
| WO | WO 2005-116665 | 12/2005 |

* cited by examiner

*Primary Examiner*—Helen C. Kwok
(74) *Attorney, Agent, or Firm*—King & Spalding LLP; Kenneth H. Sonnenfeld; Joseph D. Eng, Jr.

(57) ABSTRACT

This invention relates to high precision, fluid-containing, transducer-based accelerometers that are capable of measuring acceleration, inclination, position and velocity by measuring the electronic response of a transducer to fluid flow caused by external acceleration or by free convection. The accelerometers of this invention are capable of varying the local density of the fluid, thereby creating a volume of fluid with a lower or higher density compared to the rest of the fluid in the accelerometer. The movement of this volume of lower or higher density fluid as a result of external acceleration is measured to determine the external acceleration.

14 Claims, 10 Drawing Sheets

US 7,578,188 B2

CONVECTIVE ACCELEROMETER WITH "POSITIVE" OR "NEGATIVE" INERTIAL MASS

FIELD OF THE INVENTION

This invention relates to high precision, fluid-containing, transducer-based accelerometers that are capable of measuring acceleration, inclination, position and velocity by measuring the electronic response of a transducer to fluid flow caused by external acceleration or by free convection. Generally, accelerometers have found wide application in many fields, including transportation, inertial navigation systems, robotics, consumer electronics, toys and medical devices.

BACKGROUND OF THE INVENTION

Various mechanical and electromechanical instruments have been developed for measuring acceleration, inclination, velocity, and motion, including piezoelectric and piezoresistive instruments, and force balanced, capacitive or convective accelerometers.

In a force-balanced accelerometer, an inertial mass is suspended by a spring that allows it to move between two permanent magnets. When a force-balanced accelerometer experiences an external acceleration, the inertial mass is displaced from its normal resting position. A sensor within the accelerometer produces an electrical signal that is subsequently amplified and passed through a conductive coil that surrounds the mass. The level of amplification is selected such that the conductive coil produces a rebalancing force that restores the inertial mass to its original resting position. Because the magnitude of the rebalancing force is proportional to the external acceleration, the magnitude of the external acceleration can be determined by measuring the amplified electrical signal. Accelerometers of this type have high sensitivity and accuracy. However, they are expensive, susceptible to mechanical wear, and only capable of measuring linear accelerations.

An example of an accelerometer capable of measuring angular accelerations is a resistive accelerometer. In this type of accelerometer, gas is injected through a nozzle into a chamber while an external acceleration is applied. The chamber has two wires arranged so that the injected gas is uniformly distributed between the sensing elements in the absence of external acceleration. In the presence of acceleration, the injected gas will tend to accumulate near one of the wires, causing it to become colder than the other wire by convective cooling. In turn, this causes a measurable difference in the resistance of the two sensing elements that is proportional to the angular velocity. However, a significant disadvantage of this type of accelerometer is that it requires the presence of a spraying nozzle, which makes the accelerometer bulky and expensive.

Yet another type of accelerometer is a convective accelerometer. An example of a prior convective accelerometer is one that contains a heating element installed at the center of housing, with two temperature sensing elements arranged symmetrically in the housing with respect to the heating element. The heating element heats a gas enclosed in the housing, causing it to circulate symmetrically about the housing in the absence of an external acceleration. In this situation, the temperature sensors are at the same temperature, so that the difference in their readings is essentially zero, indicating a quiescent state. However, when an external acceleration is applied, the gas no longer circulates symmetrically, which causes the sensing elements to be at different temperatures. The magnitude of the temperature difference is proportional to the external acceleration. However, convective accelerometers of this type have significant disadvantages, including low dynamic range, low sensitivity, inability to measure purely rotational motion, and high energy consumption of energy due to the energy requirements of the heating element.

Another type of accelerometer is a linear electrochemical accelerometer that contains a mechanical oscillating electrolyte-based system and electrochemical transducer that converts the electrolyte flow during oscillations into an electric current. A substantial drawback of this type of accelerometer is that it cannot measure acceleration when the acceleration is constant. This drawback results from the fact that the overall transfer function of the accelerometer, which describes the response of the accelerometer as a function of the frequency of the acceleration, goes to zero when the frequency of the acceleration goes to zero. This behavior can be understood by examining the relationship between the overall accelerometer transfer function and the transfer functions corresponding to the mechanical oscillating system and to the electrochemical transducer, respectively. At zero frequency, the transfer function of the electrochemical transducer becomes a constant, while the transfer function of the mechanical oscillating system goes to zero. Thus, because the overall transfer function of the accelerometer is the product of these two transfer functions, the overall transfer function of the accelerometer goes to zero at zero frequency.

An additional drawback of the linear electrochemical accelerometer described above is the relationship between the value of the low frequency cut-off of the accelerometer and the diameter of the accelerometer. Because the low-frequency cut-off is inversely related to the diameter of the accelerometer, it is impossible to reduce the size of the accelerometer without increasing the low-frequency cut-off, thereby sacrificing some of the performance of the accelerometer. Another drawback of a linear electrochemical accelerometer is that the transfer function of the electromechanical transducer is not an analytical function of the frequency. Thus, additional correction elements must be included in the conditioning electronics in order to obtain uniform sensitivity in a wide frequency range (i.e., a flat acceleration transfer function of the accelerometer). The requirement of additional correction elements increases the self noise of the accelerometer.

Thus, there is an urgent need for an accelerometer that is capable of measuring constant acceleration, and that has wide frequency and dynamic ranges, small size, low power consumption, low weight and low cost.

SUMMARY OF THE INVENTION

One of the objects of this invention is to provide a convective accelerometer capable of measuring constant acceleration, and that has wide frequency and dynamic ranges, small size, low power consumption, low weight and low cost.

In one embodiment of this invention, the convective accelerometer contains a sealed housing with two fluidly interconnected cavities. One of the cavities is completely filled with a liquid agent containing an electrolyte, while the other is only partially filled. The convective accelerometer further contains at least two installation modules secured in the cavity that is completely filled with liquid agent. Each installation module contains a sensing element rigidly mounted within that is capable of sensing convection. The sensing element includes a cathode and an anode that are spatially separated and that permit the liquid agent to flow through them when an externally applied acceleration causes forced convection of the liquid agent. At least two installation modules are oriented such that a cathode in one of the installation modules faces a cathode of another of installation modules, or an anode of one of the installation modules faces the anode of another of the installation modules. As described herein, when a potential is applied to the electrodes in adjacent installation modules, the potential experienced by the liquid agent between the installation modules causes either an increase in the density of the liquid agent (i.e., the formation of a "positive inertial mass") or a decrease in the density of the liquid agent (i.e., the formation of a "negative inertial mass"). The movement of this region of increased (or decreased) density as a result of an applied acceleration is detected by sensors and used to determine the magnitude of the acceleration. Optionally, conductive members may be interposed between the two installation modules. An electronic circuit is connected to the sensing elements which is capable of amplifying and processing the electrolyte current caused by the flow of the positive or negative inertial mass.

DETAILED DESCRIPTION OF THE INVENTION

This invention provides a small, lightweight, inexpensive convective accelerometer that has wide frequency and dynamic ranges, low power consumption, and the ability to measure constant acceleration. As described herein, the convective accelerometer of this invention can measure acceleration by using an electric field to create density gradients in a liquid agent and then monitoring the motion of the inhomogeneous liquid agent when an external acceleration is applied.

Figure 1:
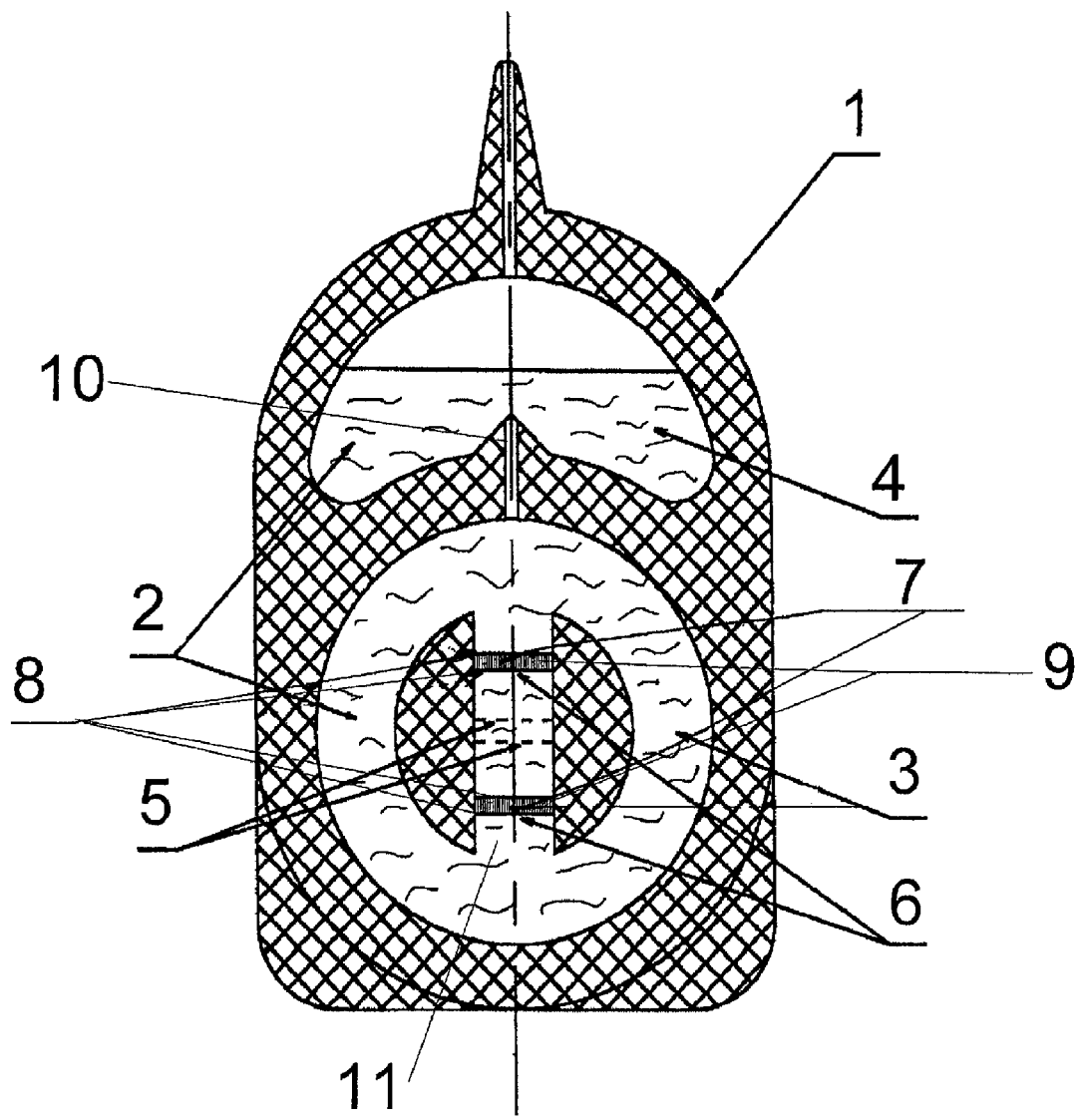
FIG. 1: A schematic diagram showing one embodiment of the convective accelerometer according to the invention.

FIG. 1 shows a schematic diagram of a convective accelerometer according to one embodiment of the invention. The convective accelerometer includes a sealed housing 1 that houses a liquid agent 2 (a liquid electrolyte) in a toroidal cavity 3 and a reservoir cavity 4. The toroidal cavity 3 and reservoir cavity 4 are fluidly interconnected by capillary 10. The toroidal cavity 3 further includes a channel 11 having its major axis located in the plane defined by the toroidal cavity 3. In preferred embodiments, the channel 11 is symmetrically positioned with respect to the toroidal cavity 3, such that it is aligned with a diameter of the toroidal cavity 3. However, it is also possible to have channel 11 positioned such that it is not on a diameter of the toroidal cavity 3. Moreover, channel 11 does not need to be aligned in any particular orientation with respect to a major axis of the accelerometer. Located within channel 11 are installation modules 6, each of which houses a sensing element 7 and which serves to rigidly hold the components of sensing element 7 with respect to each other for ease of installation. In preferred embodiments, at least two installation modules 6 are present in channel 11 and there is an even number of installation modules present. For certain preferred embodiments, each installation module 6 contains a pair of conductive members 8 separated by a dielectric spacer 9, although this invention also contemplates installation modules containing more conductive members 8 and optionally more dielectric spacers 9, as described herein. If desired, conducting elements 5 may be added optionally added, as described herein. Generally, both the toroidal cavity 3 and channel 11 are completely filled with liquid agent 2. On the other hand, reservoir cavity 4 is only partially filled with liquid agent 2. In this way, reservoir cavity 4 allows for the thermal expansion of liquid agent 2 that can result from temperature changes in the surrounding environment.

Figure 10:
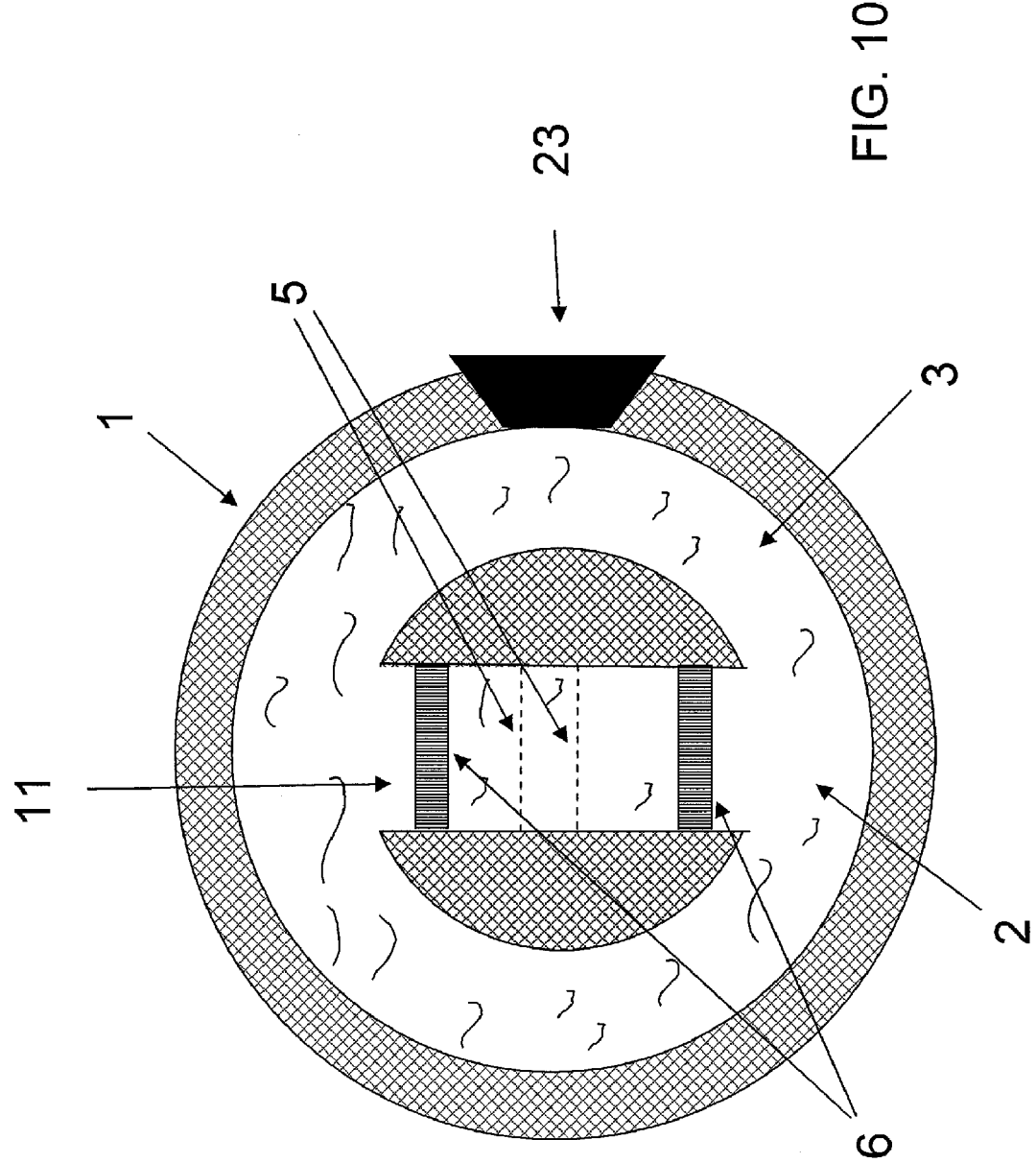
FIG. 10: A schematic diagram showing one embodiment of the convective accelerometer according to the invention. The reference numbers in this figure that are the same as in FIG. 1 correspond to the same elements.

It should be noted that the presence of reservoir cavity 4 is not required in some embodiments of the invention. For example, when the convective accelerometer is to be mounted in an environment where the temperature fluctuations are not sufficiently large to cause damage from the thermal expansion of liquid agent 2, the convective accelerometer may be fashioned without reservoir cavity 4. In other embodiments, damage resulting from the thermal expansion of liquid agent 2 can be prevented by the use of a flexible membrane 23 rather than reservoir cavity 4 (FIG. 10). The flexible membrane 23 seals the liquid agent 2 within the toroidal cavity 3, and will stretch when the liquid agent 2 thermally expands to the point where it exerts pressure on the flexible membrane. Suitable materials for the flexible membranes contemplated by this invention include any material that is chemically inert to the liquid agent 2 and capable of being mechanically deformed in response to the pressure caused by the thermal expansion of liquid agent 2 without rupturing. Non-limiting examples of materials suitable for the construction of said flexible membrane 23 include rubber and Teflon®. In certain preferred embodiments, the flexible membrane 23 is made of rubber and is in the shape of a thin rubber plug.

While the foregoing describes embodiments that use reservoir cavity 4 or a flexible membrane to avoid damage caused by the thermal expansion of liquid agent 2, this invention also contemplates the use of both a reservoir cavity and a flexible membrane simultaneously in certain embodiments.

In some preferred embodiments, each of the sensing elements 7 contains two metal plates 8, with one serving as a cathode and one as an anode, separated as described herein. In preferred embodiments, pairs of sensing elements 7 are arranged in the channel 11 such that either (1) the cathode of one of the sensing elements 7 faces the cathode of the other sensing element 7 of the pair, or (2) the anode of one of the sensing elements 7 faces the anode of the other sensing element 7 of the pair. In other words, for a given pair of sensing elements arranged in the channel, two electrodes of the same polarity will face each other. Thus, when a potential is applied to the electrodes of the pair of sensing elements 7, the portion of liquid agent 2 located between electrodes of the same polarity will experience an increase or decrease in density, depending on whether the electrodes facing each other are cathodes or anodes. More specifically, if two cathodes face each other, the resulting electric potential will tend to drive out the negatively charged ions of the liquid agent 2 between the two cathodes, leading to a decrease in the density of the liquid agent in that region. This potential-induced lower density portion of liquid agent 2 is said to be a "negative inertial mass". On the other hand, if two anodes face each other, the resulting potential will cause an accumulation of negatively charged ions in the region of liquid agent 2 between the anodes, leading to an increase in the density of the liquid agent 2 in that region. This potential-induced higher density portion of liquid agent 2 is said to be a "positive inertial mass". The magnitude of the "positive inertial mass" or "negative inertial mass" is defined by the concentration of the charged carriers and the volume of the liquid agent exposed to the potential.

Because the positive inertial mass and the negative inertial mass have a different density compared to the rest of liquid agent 2, an externally applied acceleration with a component along the channel 11 will cause them to respond differently compared to the rest of liquid agent 2. Moreover, the positive inertial mass responds differently than a negative inertial mass. More specifically, when a negative inertial mass experiences an acceleration with a component along channel 11, it accelerates in the same direction as the acceleration, but a positive inertial mass accelerates in the opposite direction.

The resulting movement of the positive or negative inertial mass causes the liquid agent 2 in the toroidal cavity 3 to start flowing as well. The shape of the toroidal cavity 3 allows the liquid agent to flow and to circulate continuously without the need to apply any restoring force. The flow of the liquid agent 2 transfers and drags ions towards the sensing elements 7 due to the forced convection.

Attached to the sensing elements 7 are signal-conditioning electronics (FIG. 2) that are capable of detecting the ion current in the channel 11 caused by the flow of liquid agent 2. Thus, by measuring the convective ion current when the accelerometer is at rest and when the accelerometer is under an external acceleration, the signal-conditioning electronics calculate the change in the convective ion current caused by the acceleration. This change in the convective ion current is related to the magnitude of the component of the acceleration along the channel 11. For example, when two installation modules are placed in the channel to monitor the ion current associated with the movement of a negative inertial mass, the convection of the liquid agent drags the ions in the channel. As a result, the ion concentration increases in the vicinity of the cathode of one installation module and decreases in the vicinity of the cathode of the other installation module. As a result, the ion current detected at the first cathode increases while the current at the second cathode decreases. The difference between this current is proportional to the external acceleration. Moreover, when the acceleration is the result of gravity, the change in ion current can be related to the degree of inclination of the channel relative to the direction of the acceleration due to gravity.

Figure 2:
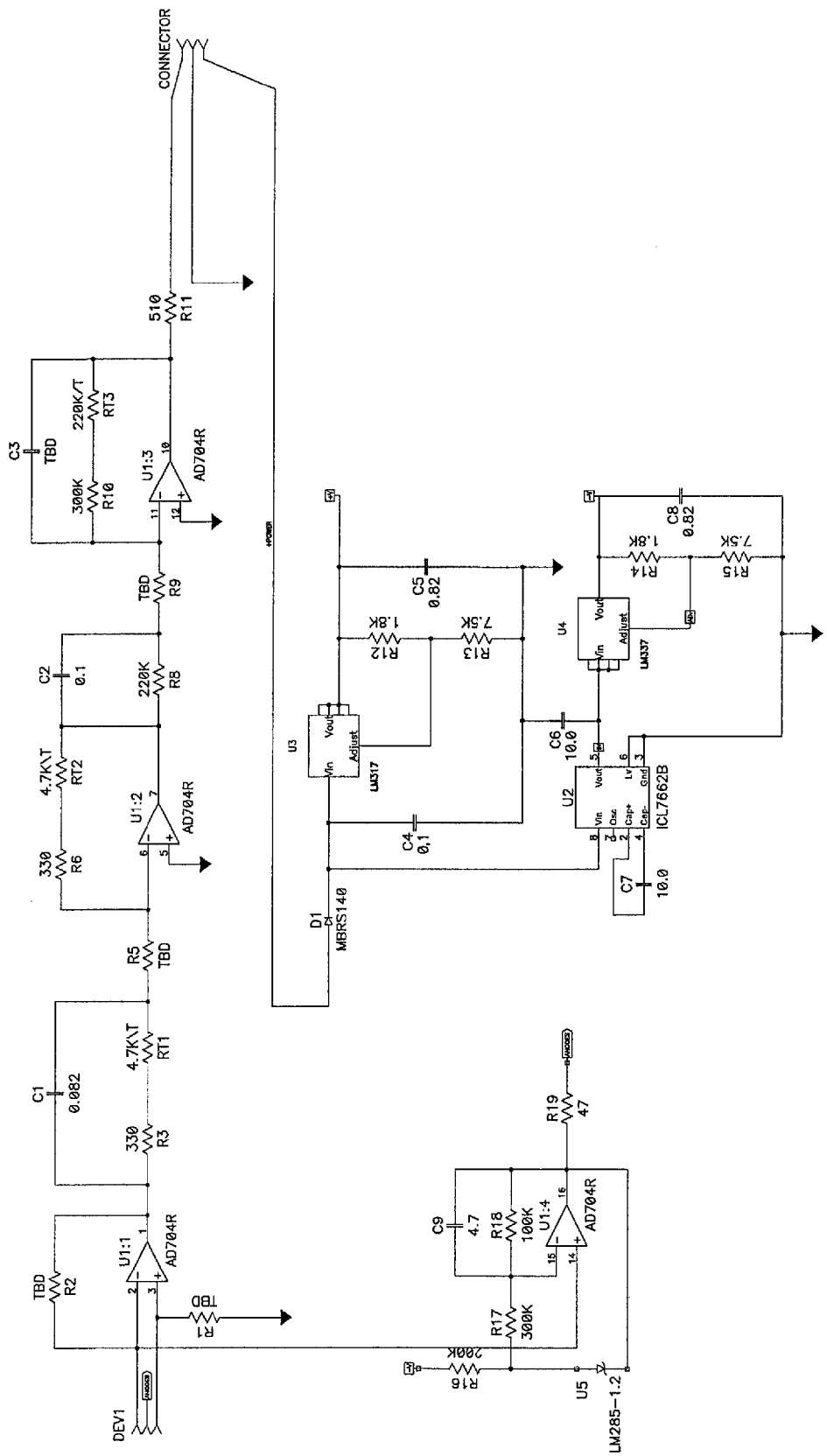
FIG. 2: A schematic diagram of the signal electronics according to one embodiment of the invention.
Figure 3:
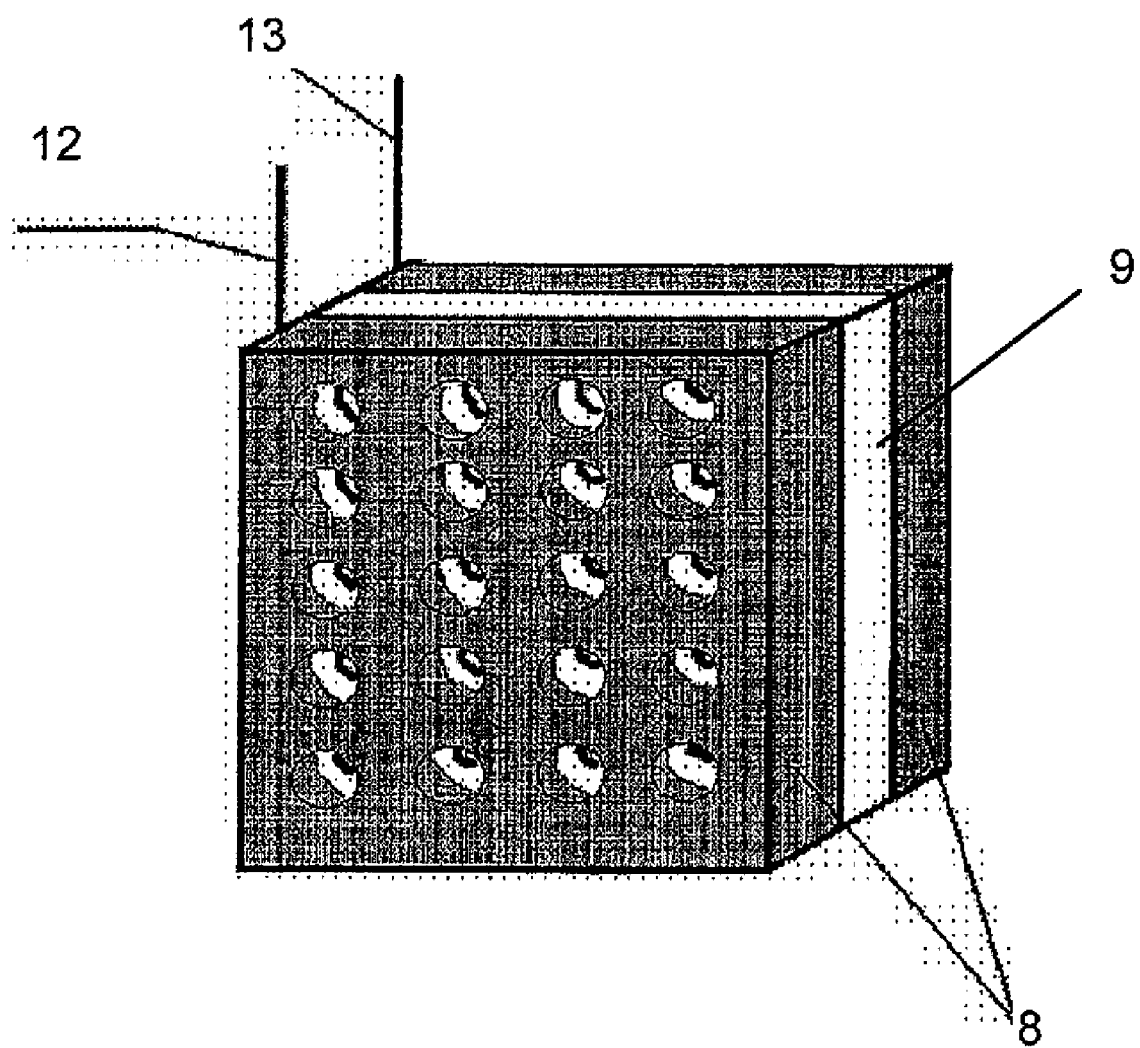
FIG. 3: A schematic diagram showing an example of a sensing element suitable for the convective accelerometer of this invention.
Figure 4:
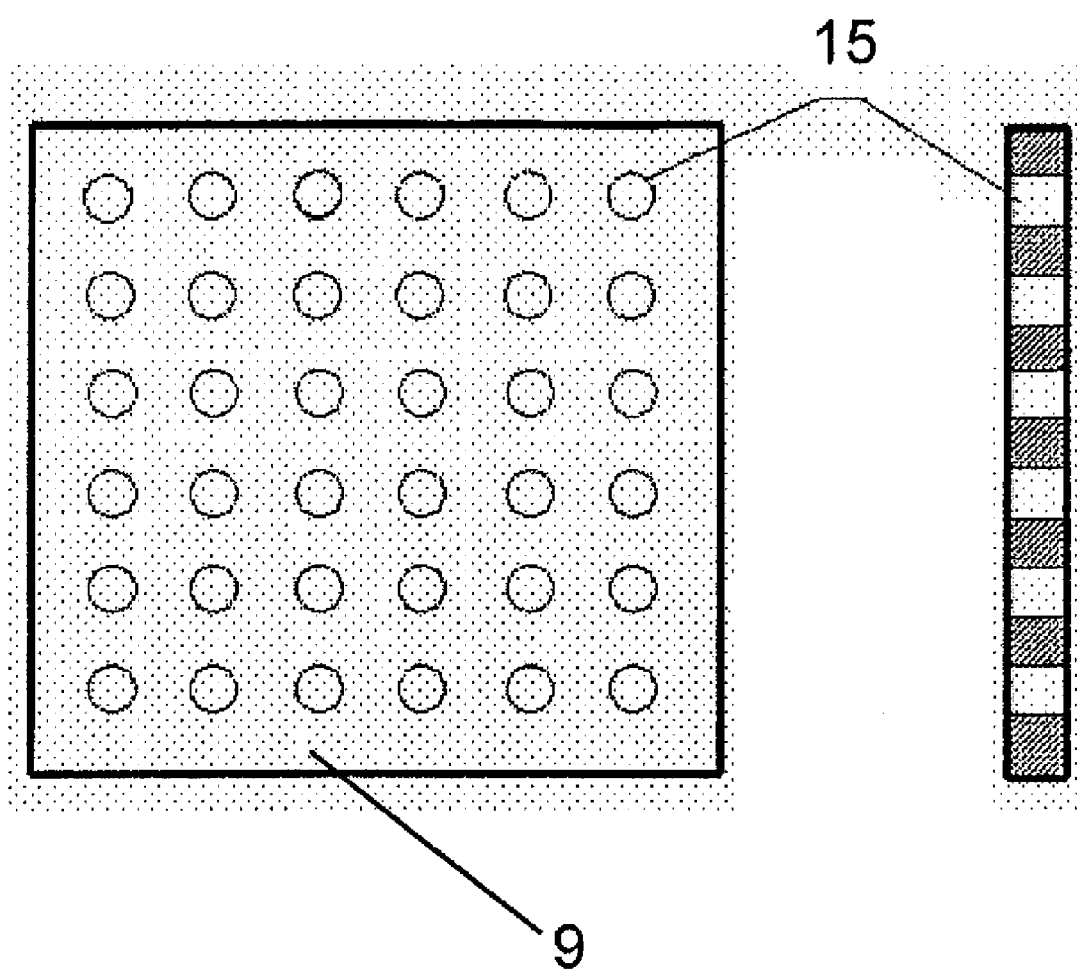
FIG. 4: A schematic diagram of a dielectric spacer according to one embodiment of this invention.

In certain preferred embodiments, the sensing elements 7 of the invention contain a two spatially separated conductive members 8 (FIG. 3), to which are connected output contacts 12, and 13 that lead to the signal-coordinating electronics (FIG. 2). As shown in FIG. 3, the conductive members 8 preferably are spatially separated by interposing a dielectric spacer 9 between them to prevent short-circuiting. In certain preferred embodiments, the dielectric spacer 9 will have holes 15 (FIG. 4) that are arranged in a pattern that corresponds to holes in the conductive member 8. However, this invention also contemplates preventing short-circuiting by rigidly mounting conductive plates within the installation module 6 such that they are spatially separated. The conductive members 8 can be made of any conductive material that is not corroded by the liquid agent 2 under the electrochemical conditions within the accelerometer. In preferred embodiments, the conductive members are made of metal, non-limiting examples of which include the Pt-group metals or its alloys, Most preferably, the conductive member is a $Pt_x Ir_{1-x}$ alloy. The conductive members 8 may be, for example, in the form of a metal plate or a metal mesh. In a particularly preferred embodiment, the conductive members 8 are a metal plate with a plurality of holes are formed in a regularly spaced array.

If desired, one or more dielectric spacers 9 may also be added to cause laminar flow of liquid agent 2 through the sensing element 7. In certain preferred embodiments, a dielectric spacer 9 is placed between two conductive members 8. The thickness of the dielectric spacer 9 also affects the frequency range of the measurement, as set forth below. The diameter d and the number of holes 15 in the dielectric spacer 9, in turn, determine the accelerometer sensitivity and have an effect on the frequency dependence of the accelerometer transfer function in the full frequency operating range. With an increase of the number of holes 15 and an increase of their diameter d the hydrodynamic impedance of the dielectric spacer 9 decreases in inverse proportion to the number of holes 15 and the fourth power of their diameter d. Thus, by varying the number and diameter of the holes, the transfer function of the accelerometer can be varied. More specifically, the high cutoff frequency of the transfer function is proportional to the hydrodynamic impedance, such that the frequency range increases with increasing hydrodynamic impedance. With this in mind, a useful number of holes 15 is four or more for dielectric spacers 9 that are square, with a side dimension of 1.5×1.5 mm. Moreover, a useful range of hole diameter is between about 1 and about 300 microns, and preferably between about 20 to about 200 microns.

The material of the spacers 9 should be resistant to corrosion by the liquid agent 2, and should have a thermal expansion coefficient that is compatible with the other components of sensing element 7 so as to avoid damage as the result of temperature variations. Many different materials may be used, with suitable materials including, for example, oxides or fluorides of elements of the fourth group of the Periodic Table, forsterite, quartz, and glass. A useful range of spacer thickness is from about 0.5 to about 150 microns.

The shape of the holes in the conductive members 8 and dielectric spacers 9 is not particularly limited and may be in any shape. Geometrical shapes such as, for example, squares, rectangles, circles and/or ovals are used in some embodiments. However, because, the intensity of the electric current passing through the conductive members of sensing element 7 is directly proportional to the area of the conductive member in contact with the liquid agent 2, in a particularly preferred embodiment, the holes are circular apertures with "rays" extending radially (i.e., "star-shaped"). Various types of holes may be made in the conductive members and dielectric spacers by physical or chemical methods, non-limiting examples of which include stamping, laser drilling, chemical etching, and electrochemical methods.

The number of installation modules 6 and the corresponding sensing elements 7 chosen for a particular accelerometer depends on the required dynamic range of accelerations to be measured, the required degree of linearity, the frequency range, and the level of intrinsic noise. Generally, increasing the number of installation modules and sensing elements leads to increased dynamic range, linearity, frequency range, and decreased intrinsic noise.

To detect the current flow that results from the movement of a positive or negative inertial mass, the sensor elements 7 are connected to an electronic circuit. Generally, this invention contemplates any electronic circuit that is capable of measuring changes in the current detected by the sensor elements 7 of the convective accelerometer when the electrolyte flows as the result of an applied external acceleration. FIG. 2 shows one preferred embodiment, in which the signal conditioning electronics includes a power source which produces the potential difference between anodes and cathodes. Two operational amplifiers are used for a current-to-voltage transformation. The inverting input is connected to the cathodes and the non-inverting input is grounded. A differential amplifier produces an output voltage that is proportional to the voltage difference between outputs of the operational amplifiers that serve as current-to-voltage transformers. Optionally, the signal electronics includes temperature compensating circuits.

The sensitivity of the accelerometer also depends on the physical and chemical properties of the liquid agent 2 contained in the housing 1. In preferred embodiments, it is desirable that the liquid agent 2 has a minimum viscosity at maximum solubility. Further, the liquid agent may comprise a salt (e.g., a salt of an alkali metal or an alkaline earth metal) and a solute capable of acting as both a Lewis acid and a Lewis base, such as dissolved metallic iodine. Suitable solvents for this purpose include, for example, distilled water and organic solvents capable of dissolving organic or inorganic salts, preferably metal salts, such as alkali salts. When dissolving the salts of alkali metals, the density of the solution increases, resulting in an increase of the sensitivity of the accelerometer. Therefore, in certain embodiments, it is desirable that the concentration of the dissolved salts is high, preferably, close to the solubility limit. Generally speaking, a useful concentration range for the dissolved salt is about 0.5 to about 4.0 mol/liter, and preferably about 2 to about 4 mol/liter. Also, the purities of the salt and the solute that acts as a Lewis acid/base (e.g., iodine) should be at least 98.5%, but most preferably at least 99.98%. The electric current output of the accelerometer is determined by the concentration of the dissolved metallic iodine, the ions of which are carriers of charge that are capable to receive an electron from and to give back an electron to the conductive members 8. Thus, it is useful to have a saturated solution of the above salts and minimum concentration of 0.0002 N of dissolved metallic iodine. Such a concentration of the dissolved salts provides operation of the instrument in a wide range of negative temperatures, e.g., down to −70° C. The metallic iodine concentration may be lower, but in this case the current output of the claimed accelerometer may be insufficient for normal operation of the electric circuits, including the circuits used for temperature and frequency correction. A useful concentration range for the dissolved metallic iodine is about 0.0002 to about 0.4 mol/liter, and preferably from about 2 to about 4 mol/liter. The dissolved salts may comprise salts of metals of Group II of the periodic table which have a solubility in the fluid that is not lower than that of salts of alkali metals. The most suitable for this purpose are, for example, salts of barium, which, at maximum solubility, have solution densities that exceed the corresponding solution density of salts of alkali metals by 1.5 times, for a given molar concentration of salt solute.

In addition to the electrolyte concentration of the liquid agent 2, another factor which affects the magnitude of the positive or negative inertial mass is the magnitude of electric potential generated in the space between sensing elements 7 in the channel 11. For example, if the distance between sensing elements 7 is increased, then the electric potential generated by the two facing anodes or two facing cathodes of a pair of sensing elements 7 will permeate a larger volume of the liquid agent 2, leading to a larger positive or negative inertial mass. The larger inertial mass of such convective accelerometers are advantageous for measuring low-level signals and obtaining higher signal-to noise ratio. On the other hand, in some embodiments, it is preferable to decrease the distance between sensing elements 7, so that the electric potential between the sensing elements 7 permeate a smaller volume of liquid agent 2. Such small-inertial-mass convective accelerometers are useful for measuring of large accelerations, as the smaller inertial mass provides a faster response. In certain preferred embodiments, the distance between the sensing elements is about 1-6 mm, more preferably 2-5 mm, and even more preferably 3-4 mm.

Figure 5:
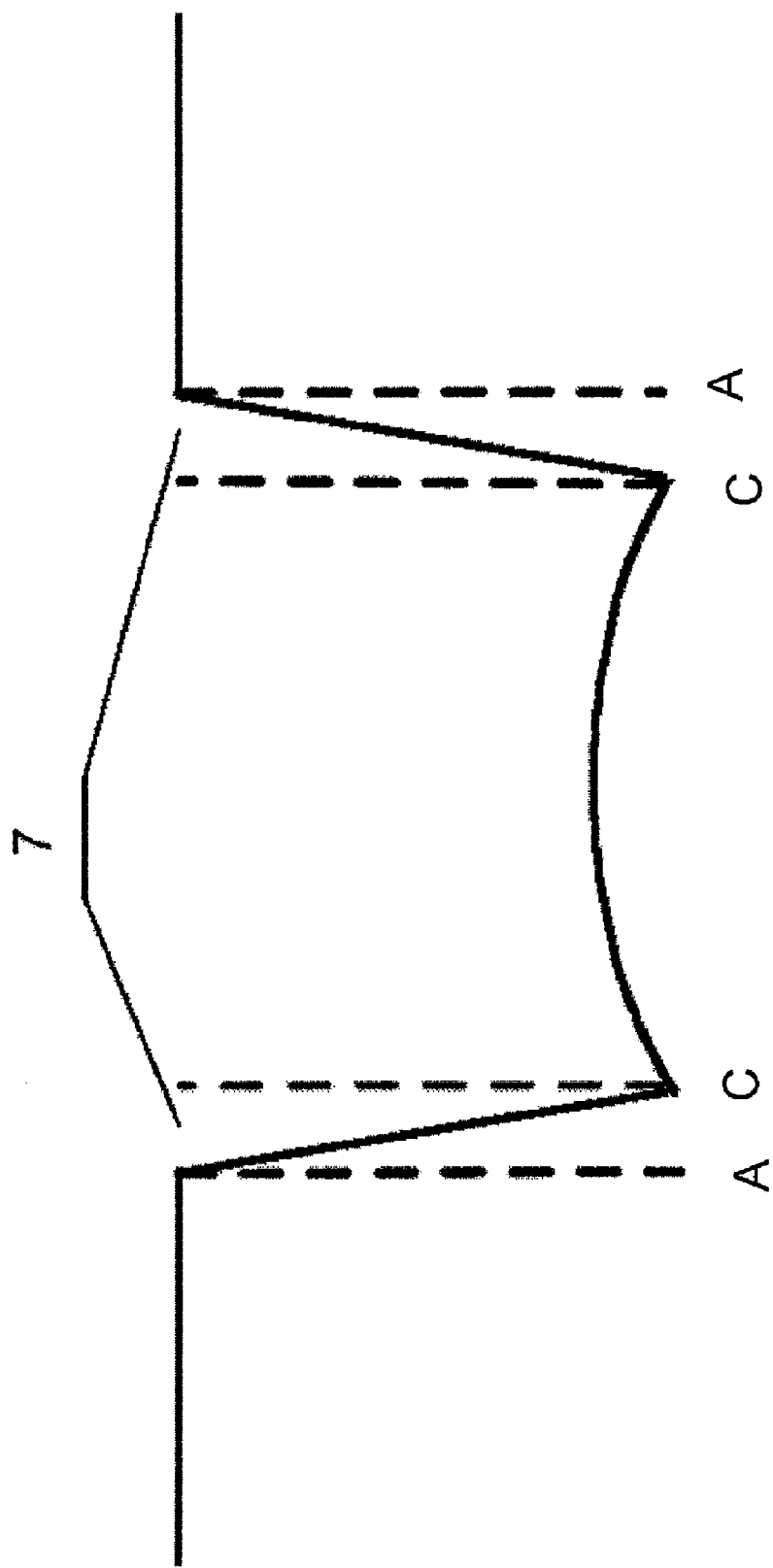
FIG. 5: A plot of the ion concentration as a function of position within the channel when a voltage is applied to the electrodes to cause the formation of a "negative mass" by excluding charged carriers from the region between the electrodes. "A" represents an anode and "C" represents a cathode.
Figure 6:
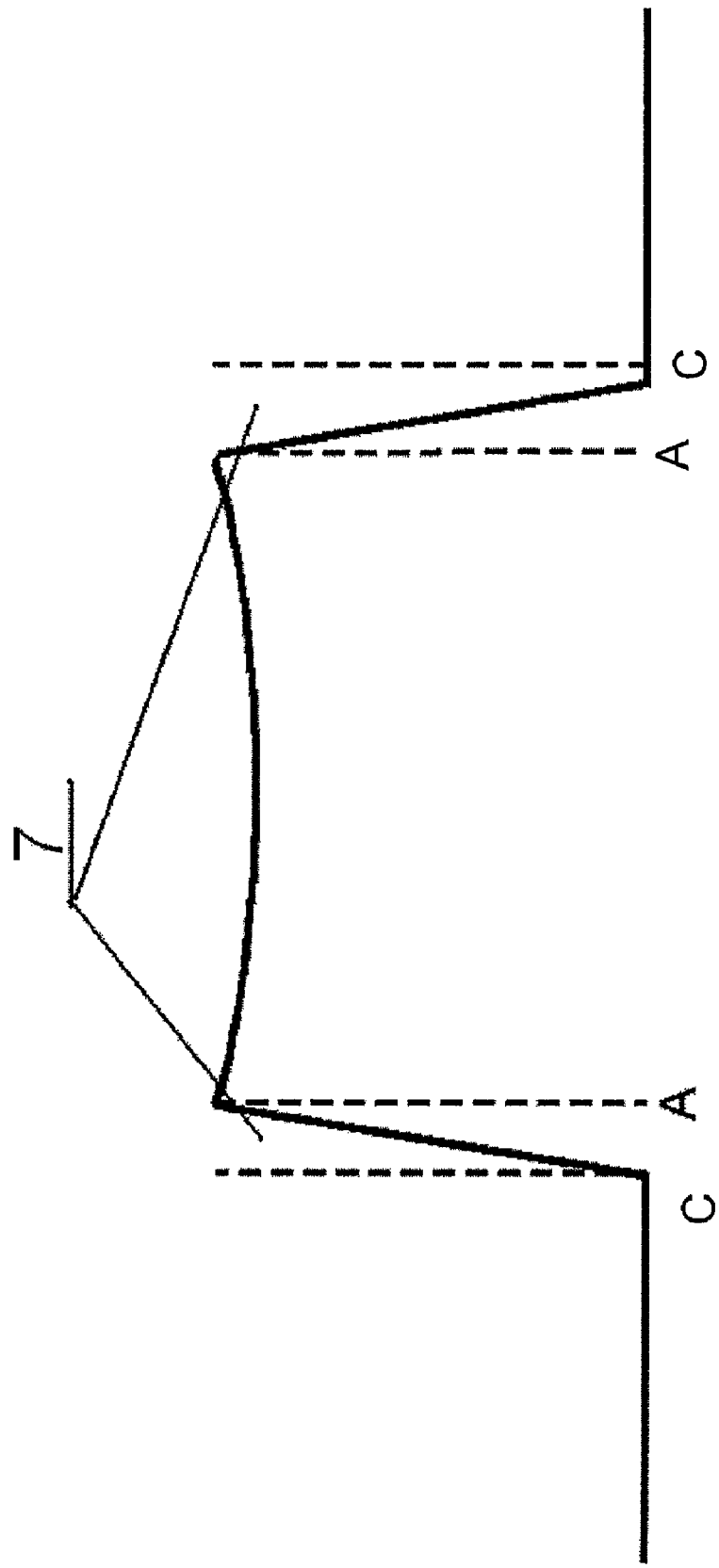
FIG. 6: A plot of the ion concentration as a function of position within the channel when a voltage is applied to the electrodes to cause the formation of a "positive mass" by trapping charged carriers in the region between the electrodes. "A" represents an anode and "C" represents a cathode.

FIG. 5 illustrates the distribution of the ion concentration inside the channel 11 when the voltage is applied to two sensing elements 7 arranged such that the cathodes of the sensing elements 7 face each other. As seen in FIG. 5, the negative ion concentration in the space between sensing elements 7 is very low, as a result of the negative field region generated by the two cathodes. On the other hand, if the sensing elements 7 are arranged such that two anodes face each other, then the resulting positive field region attracts the negative ions in the liquid agent 2, causing the formation of both a higher local charge density and a higher solution density (i.e., a positive inertial mass) (see FIG. 6)

Because the rate of formation of the positive or negative inertial mass governs the "set time" of the accelerometer (i.e., the time it takes for the accelerometer to overcome the transients that occur when a potential is applied to the electrodes in each sensing element 7), it is often advantageous to control the rate of the formation of the positive or negative inertial mass. For example, when a short set time is desired, one could applying a large potential between the cathode and anode in each sensing element 7 of a pair. In this way, a large field is developed between the two facing anodes or two facing cathodes of the pair of sensing elements 7, which causes the negatively charged ions of the liquid agent 2 to be more rapidly ejected from or swept into the region the pair of sensing elements 7, respectively. A suitable range of potentials for this mode of operation is between about 0.05 V to about 1.2 V, more preferably between about 0.1 V to about 1.1

V, and even more preferably between about 0.2 to about 0.9 V. Note, however, that if the applied potential is set too high, there is a risk of unwanted electrochemical side reactions, including electrolytic dissociation of the electrolyte in the liquid agent.

Figure 7:
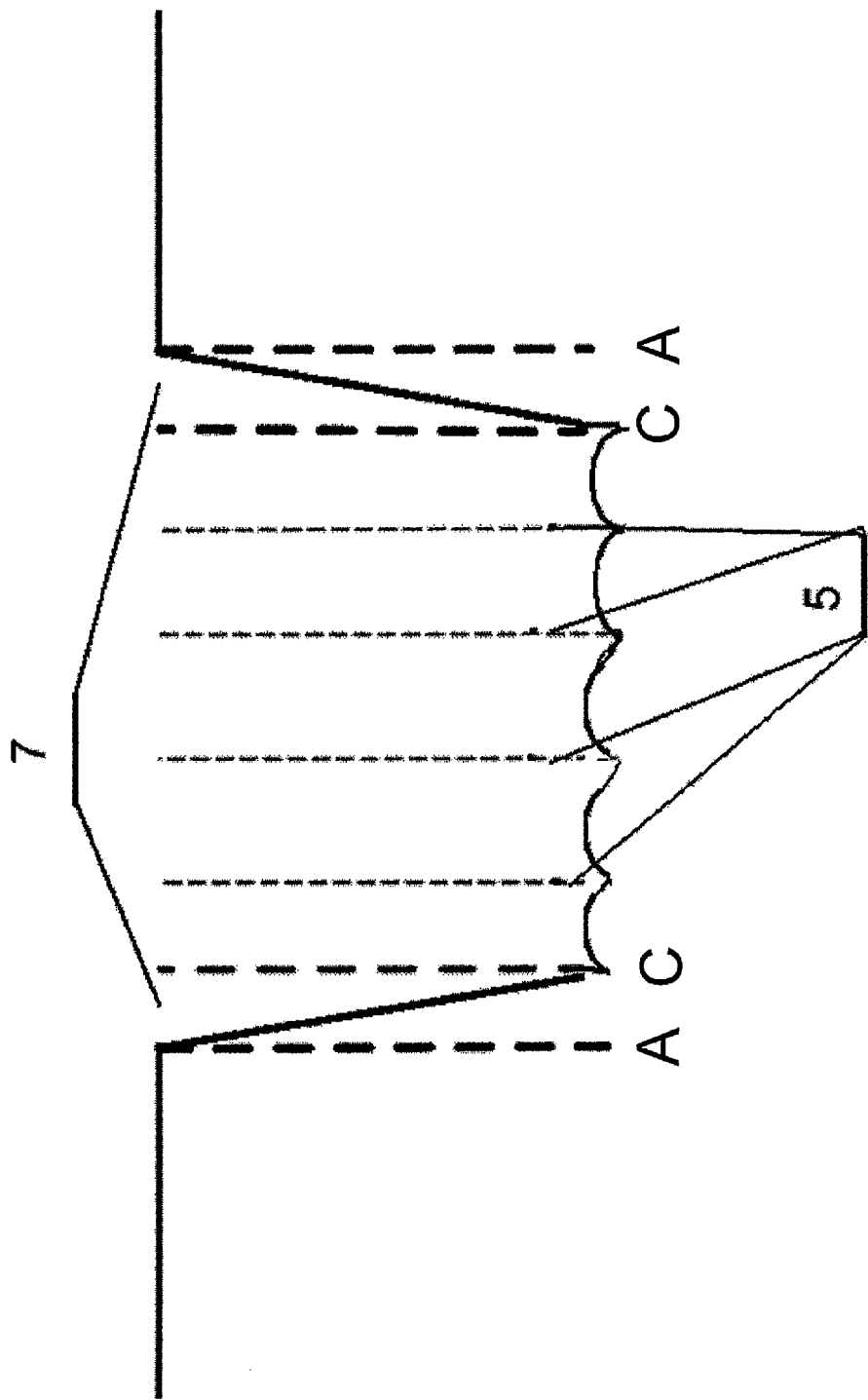
FIG. 7: A plot of the ion concentration as a function of position within the channel, when a voltage is applied to the electrodes to cause the formation of a "negative mass" by excluding charged carriers from the region between the electrodes. By applying an appropriate voltage to additional electrodes spaced within the channel, the diffusion time of electrodes within the channel decreases, which enables the accelerometer to create a "negative mass" more quickly, thereby providing the accelerometer with a faster response. "A" represents an anode and "C" represents a cathode.
Figure 8:
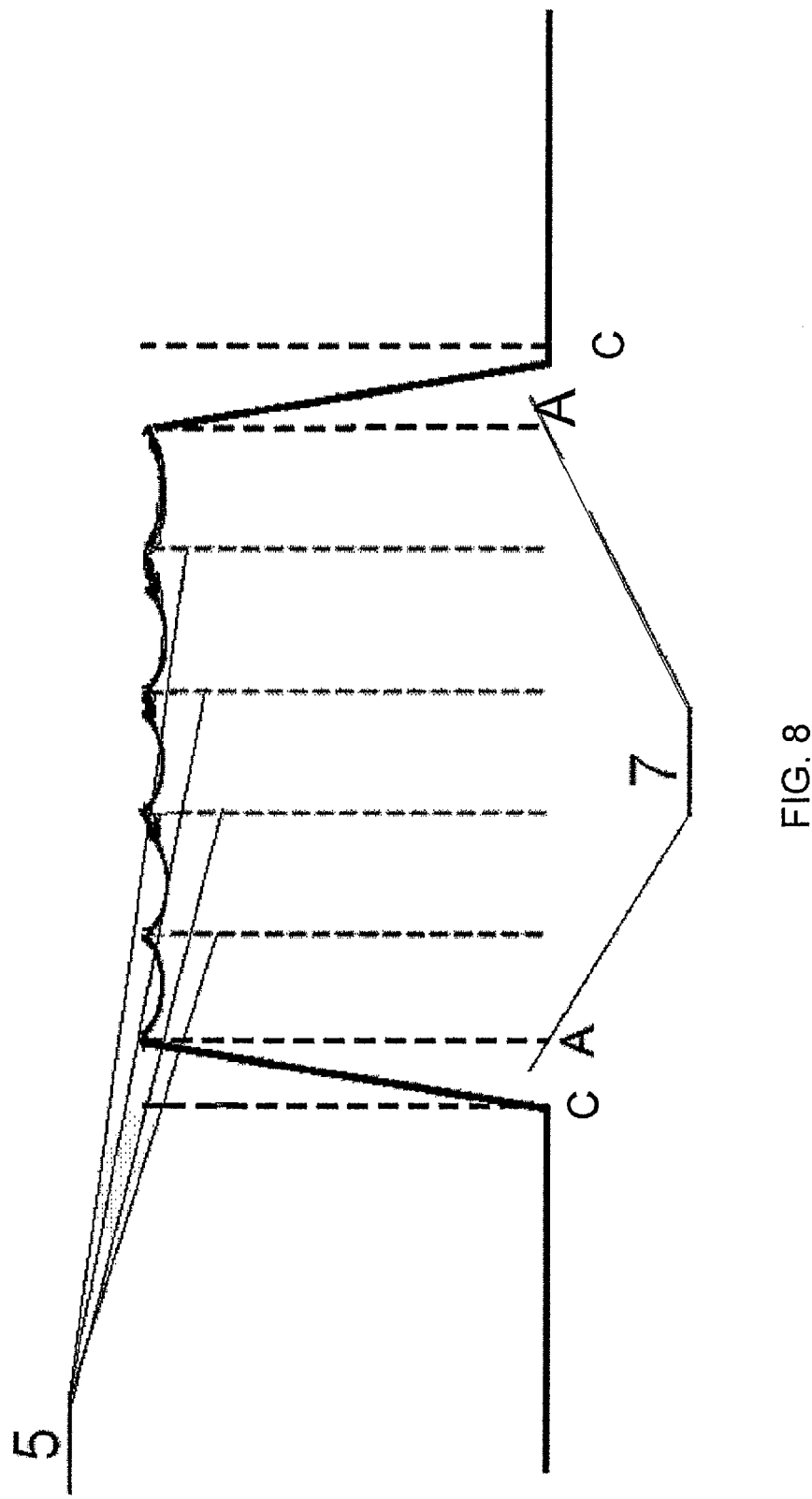
FIG. 8: A plot of the ion concentration as a function of position within the channel, when a voltage is applied to the electrodes to cause the formation of a "positive mass" by trapping charged carriers within the region between the electrodes. By apply an appropriate voltage to additional electrodes spaced within the channel, the diffusion time of electrodes within the channel decreases, which enables the accelerometer to create a "positive mass" more quickly, thereby providing the accelerometer with a faster response. "A" represents an anode and "C" represents a cathode.

In a preferred embodiment of this invention, the set time of the accelerometer is minimized by applying an appropriate potential to conductive members 5, which are interposed between a pair of biased sensing elements 7. When conductive members 5 are biased, they increase the rate of migration of the charge carriers into or from the space between the sensing elements, leading to the faster formation of the positive or negative inertial mass, respectively. The conductive members 5 are not particularly limited in shape, and non-limiting examples of suitable shapes include spirals and meshes. As shown in FIG. 7, when four conductive members 5 are interposed between two sensing elements with facing cathodes and biased negatively, the negative ion concentration between the sensing elements decreases compared to the case where there are no conductive members 5. Thus, the corresponding negative inertial mass that is formed has a larger magnitude compared to the case where there are no negatively biased conductive members 5 (e.g., see FIG. 5). Similarly, as shown in FIG. 8, when four conductive members 5 are interposed between two sensing elements with facing anodes and biased positively, the negative ion concentration between the sensing elements increases compared to the case where there are no conductive members 5. Thus, the corresponding positive inertial mass that is formed has a larger magnitude compared to the case where there are no positively biased conductive members 5 (e.g., see FIG. 6).

In other embodiments of the invention, the sensing elements 7 are arranged between conductive members 5 to which a bias is applied. In these embodiments, the applied bias to the conductive members 5 can serve to enhance migration of ions of the electrolyte into or away from the region between the sensing elements, depending on the sign of the applied bias. In this geometry, the conductive members 5 also serve to decrease the set time of the accelerometer.

Figure 9:
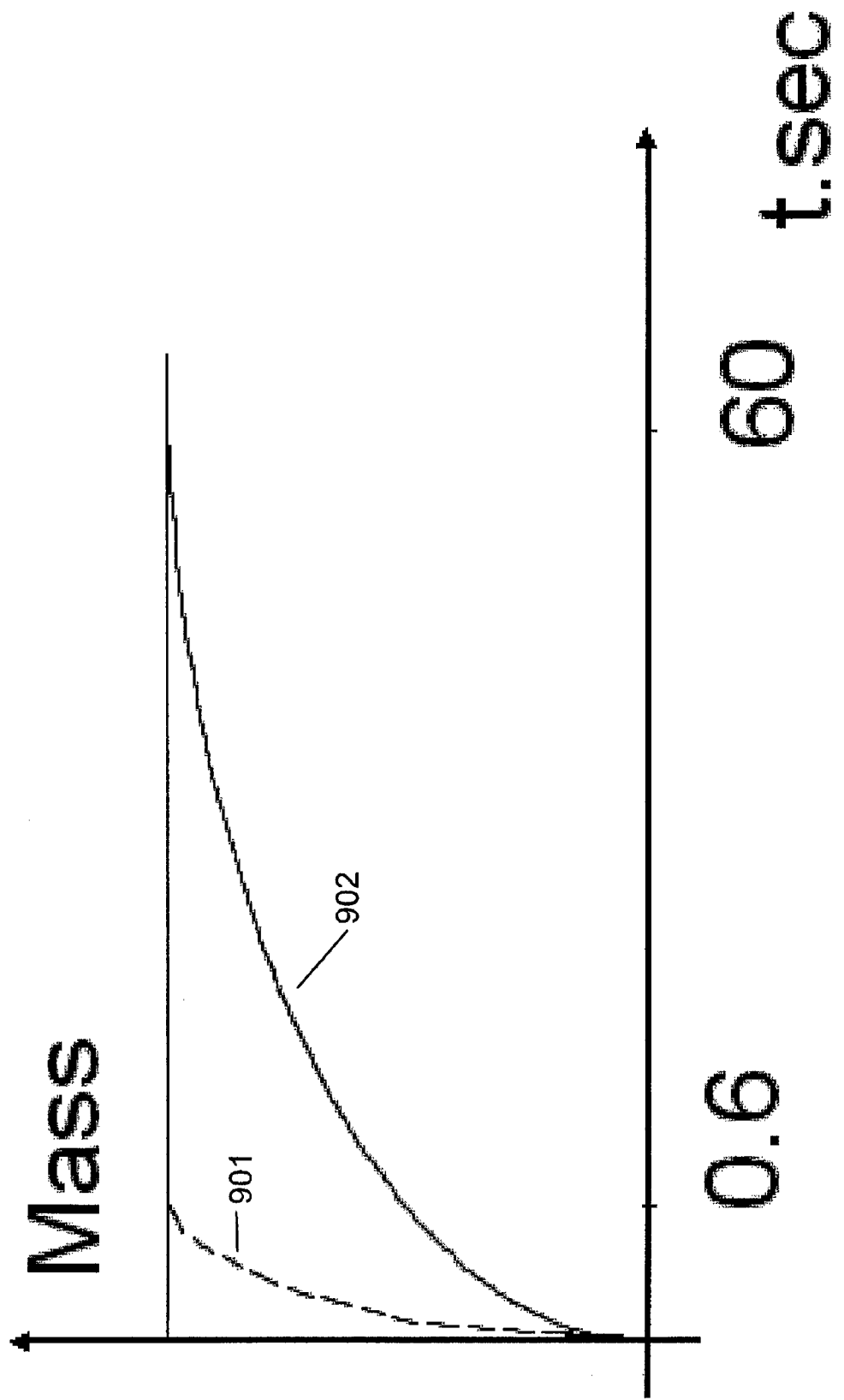
FIG. 9: A plot comparing the response time for a convective accelerometer with four conductive members versus a convective accelerometer with no conductive members. Curve 901 of this plot corresponds to the device with the four additional conductive members, while curve 902 corresponds to the device with no conductive members.

FIG. 9 shows a plot comparing the response time for a convective accelerometer with four conductive members (curve 901) versus a convective accelerometer with no conductive members (curve 902). Here, the sensing elements of the accelerometer were separated by 3 mm, and the voltage difference between the anodes and cathodes was 300 mV, with the conductive members at the same potential as the cathodes. The vertical axis represents equivalent inertial mass, so that the plot is applicable to the formation of a positive inertial mass or a negative inertial mass. The plot clearly shows that the rate of formation of a given positive/ negative inertial mass is about 100 times faster with four conductive members compared to no conductive members The performance of convective accelerometers with either positive or negative inertial mass according to invention includes three primary characteristics: noise level, dynamic range and frequency range. These primary characteristics may be adjusted by varying certain physical attributes (e.g., hole size, spacer thickness) of the convective accelerometer along with the magnitude of the positive or negative inertial mass. It should be noted that varying a certain physical attributes may improve one of the primary characteristics, but degrade another. For example, with larger holes in the conductive members and dielectric spacers, there is less noise, but the convective accelerometer also has a narrower frequency range. Moreover, if the thickness of dielectric spacer 9 is reduced, the convective accelerometer has a higher cut-off frequency. Furthermore if the distance between sensing elements 7 is increased, the size of the inertial mass that is formed between the sensing elements 7 increases, leading to lower noise levels but longer settling times.

The convective accelerometers of this invention are suitable for many applications and may be used alone or incorporated into a variety of instruments. For example, the convective accelerometers may be incorporated into navigation systems, such as those found in aircraft, spacecraft, land-based vehicles, or sea-based vehicles. In certain embodiments, it is useful to incorporate more than one convective accelerometer into the navigation system. For instance, three convective accelerometers may be arranged orthogonally, such that accelerations in the x, y, and/or z directions can be measured. Similarly, two orthogonal convective accelerometers may be used when it is only necessary to measure accelerations in the plane defined by the channels of the two convective accelerometers.

Because the convective accelerometers of the invention are small, sensitive, lightweight, and low cost, they are particularly useful in robots and other unmanned devices. For example, they may be used in devices considered to be "disposable" or "single-use", non-limiting examples of which include rockets, missiles, and robots for bomb detection/ removal and space exploration. In certain embodiments, the convective accelerometer is a part of a feedback loop that controls the motion of an unmanned device. For example, the output of the convective accelerometer may be fed into a central processor belonging to an inertial guidance system that controls the motion of an unmanned airplane or spacecraft. Of course, this invention also contemplates using the convective accelerometers in guidance systems found in manned vehicles. For example, the convective accelerometers may be used in control systems designed to detect when an automobile is about to roll over and to prevent such roll over by slowing down or changing the direction of steering.

In other embodiments, the convective accelerometers are incorporated into sensors that detect and monitor the motion of a person who is taking part in a "virtual reality" simulation. Owing to their small size and low cost, one or more convective accelerometers may be incorporated into sensors that are placed on a user's hands, feet, torso, and other body parts to monitor the motion of these body parts. The computer system that runs the virtual reality simulations may then monitor these motions and adjust the simulation accordingly.

As various changes can be made in the above-described subject matter without departing from the scope and spirit of the present invention, it is intended that all subject matter contained in the above description, or defined in the appended claims, be interpreted as descriptive and illustrative of the present invention. Modifications and variations of the present invention are possible in light of the above teachings.

We claim:

1. A convective accelerometer comprising
a sealed housing, wherein said sealed housing comprises a cavity and a channel, wherein both ends of said channel are immersed into said cavity;
a liquid agent comprising an electrolyte solution, wherein said liquid agent is contained in said sealed housing such that it completely fills said cavity of said sealed housing;
at least two installation modules secured in the sealed housing, wherein each of said at least two installation modules contains a sensing element rigidly mounted within, said sensing element comprising a cathode and an anode that are spatially separated and adapted to permit said liquid agent to flow through said cathode and said anode when an externally applied acceleration causes forced convection; and wherein the at least two installation modules are secured in an orientation such that a cathode in one of the at least two installation modules faces a cathode of another of the at least two installation modules, or an anode of one of the at least two installation modules faces the anode of another of the at least two installation modules, wherein the at least two installation modules are configured to create within the liquid agent in the channel a region that has a higher density or a lower density relative to a density of the liquid agent outside of the channel;

wherein the sensing element in each of said at least two installation modules is configured to measure convection resulting from movement of the region of higher density or lower density liquid agent caused by the externally applied acceleration; and wherein an electronic circuit is connected to said sensing elements, said electronic circuit capable of amplifying and processing electronic signals generated by said sensing elements in response to convection caused by movement of the region of higher density or lower density liquid agent as the result of the externally applied acceleration.

2. The convective accelerometer according to claim 1, wherein said cavity that is filled with liquid agent has a toroidal shape and a channel that runs along a diameter of the toroid, and wherein said installation modules are mounted within said channel.

3. The convective accelerometer according to claim 2 wherein said sensitive elements are separated by a distance from about 0.5 mm to about 100 mm.

4. The convective accelerometer as in one of claims 1-3, further comprising conductive members, wherein the conductive members are installed in the space between sensing elements or installed outside the space between sensing elements or both.

5. The convective accelerometer according to claim 4, wherein said conductive members are separated by a distance of about 10 to about 120 microns.

6. The convective accelerometer according to claim 5, wherein an anode of one of the at least two installation modules faces the anode of another of the at least two installation modules, and said conductive members are under positive potential from 0.1-0.3 V.

7. The convective accelerometer according to claim 5, wherein a cathode of one of the at least two installation modules faces the cathode of another of the at least two installation modules, and wherein said conductive members are under negative potential from 0.1-0.3 V.

8. The convective accelerometer according to claim 6, wherein said conductive members installed in the space between the sensing elements are under a positive potential relative to the cathodes of the sensing elements from about 0.1 to about 0.5 V and said conductive members, installed outside the space between the sensing elements are under the same potential of as that of cathodes of the sensing elements.

9. The convective accelerometer according to claim 5, wherein said conductive members installed in the space between the sensing elements are under potential of the cathodes of the sensing elements and said conductive members, installed outside the space between the sensing elements, are under positive potential relative to cathodes of the sensing elements from about 0.1-0.5 V.

10. The convective accelerometer with according to claim 2 wherein said cavity filled with the liquid agent with the channel has ellipsoidal or rectangular shape.

11. The convective accelerometer according to the claim 1, wherein said sealed housing comprises a reservoir cavity, wherein said reservoir cavity is partly filled with said liquid agent and is fluidly connected to said cavity.

12. The convective accelerometer according to claim 1, wherein said convective accelerometer further comprises a flexible membrane that seals said liquid agent within said cavity.

13. The convective accelerometer according to claim 12, wherein said flexible membrane comprises rubber.

14. A method of measuring an acceleration, wherein said method comprises
providing a convective accelerometer according to claim 1;
subjecting the accelerometer to an acceleration; and
measuring said acceleration.

* * * * *